(12) United States Patent
Kurano

(10) Patent No.: US 6,404,071 B1
(45) Date of Patent: Jun. 11, 2002

(54) ENGINE STOPPING APPARATUS

(75) Inventor: Yoshiaki Kurano, Shizuoka (JP)

(73) Assignee: Moriyama Manufacturing Co., Ltd., Shizuoka (JP)

( * ) Notice: Subject to any disclaimer, the term of this patent is extended or adjusted under 35 U.S.C. 154(b) by 0 days.

(21) Appl. No.: 09/615,702

(22) Filed: Jul. 13, 2000

(30) Foreign Application Priority Data

Jul. 14, 1999 (JP) .......................................... 11-200591

(51) Int. Cl.⁷ ................................................ F02N 11/06
(52) U.S. Cl. ........................ 290/40 R; 340/825.72; 180/272; 114/55.58
(58) Field of Search ................ 290/40 R; 340/825.72, 340/425.5; 307/10.1, 10.2, 10.3; 180/272, 281; 123/179.2; 114/55.58

(56) References Cited

U.S. PATENT DOCUMENTS

| | | | | |
|---|---|---|---|---|
| 4,674,454 A | * | 6/1987 | Phairr ...................... 123/179.2 |
| 4,744,322 A | * | 5/1988 | Nakase .................... 114/144 E |
| 4,946,411 A | * | 8/1990 | Novey .......................... 440/84 |
| 5,394,820 A | * | 3/1995 | Dach ........................ 114/55.58 |
| 5,486,806 A | * | 1/1996 | Firari et al. .................. 340/426 |
| 5,592,169 A | * | 1/1997 | Nakamura et al. .......... 341/173 |
| 5,794,580 A | * | 8/1998 | Galletti ..................... 123/179.2 |
| 5,942,988 A | * | 8/1999 | Snyder et al. ......... 340/825.69 |
| 6,072,248 A | * | 6/2000 | Muise et al. ............... 307/10.2 |
| 6,091,340 A | * | 7/2000 | Lee et al. ............... 340/825.31 |
| 6,116,201 A | * | 9/2000 | LaBelle ................... 123/179.2 |

* cited by examiner

*Primary Examiner*—Joseph Waks
(74) *Attorney, Agent, or Firm*—Sughrue Mion, PLLC

(57) ABSTRACT

An engine stopping apparatus includes: a vehicle body 3 with an engine mounted therein; a transponder 5 to which information on identification of a driver has been inputted; a collating circuit for transmitting a collation signal to the transponder and for identifying the driver on the basis of a response signal with respect to the same; and a control circuit for controlling the driving of the engine on the basis of a result of collation by the collating circuit, wherein the transponder 5 is arranged to be held in a state of being worn on a driver side separately from the vehicle body 3.

5 Claims, 2 Drawing Sheets

# ENGINE STOPPING APPARATUS

BACKGROUND OF THE INVENTION

1. Field of the Invention

The present invention relates to an engine stopping apparatus, and more particularly to an engine stopping apparatus for stopping an engine to prevent the theft of a compact vehicle with an engine mounted, such as a compact propelled vessel and a snow vehicle, and during an emergency.

2. Description of the Related Art

In a compact surface propelled vessel such as a water motorcycle and a compact snow vehicle such as a snowmobile, a lanyard cord is connected to a stop switch for emergency-stopping an engine which uses an engine stopping apparatus for stopping an engine when a driver has fallen off the vessel or the vehicle. One end of the lanyard cord is fitted over a wrist or the like of the driver, while bifurcated retaining claws are provided at the other end thereof When operating the vessel or the vehicle, a driving projecting portion of the engine stop switch is nipped by the retaining claws to hold the switch in a nonoperative state. When the driver has fallen off the vessel or the vehicle and the retaining claws of the lanyard cord are disengaged from the stop switch, the switch is operated to stop the engine.

In addition, a theft-preventing lanyard cord for preventing theft is conceivable in which an identification number is stored in a retaining claw portion at the tip of the lanyard cord, and the engine is made operable only when the number matches, thereby making it impossible to start the engine when a person other than a specified owner attempts to drive the vessel or the vehicle.

Meanwhile, an immobilizer is used as an apparatus for preventing theft of an automobile. This immobilizer is arranged such that a transponder in which information on identification of the owner is stored is attached to a key, and an antenna is provided on a key cylinder on the vehicle body side, and a collating circuit is connected to the antenna via a transceiver. If an ignition switch is turned by the key, the transponder incorporated in the key is automatically collated with. Since the engine cannot be started unless the transponder of the key matches with the registered identification information, the unauthorized use by a third party is prevented so as to prevent the theft.

With the conventional engine stopping apparatus using a lanyard cord, it is troublesome to fit the cord to a vehicle body side such as a vessel body or the vehicle body. Particularly when the driver has fallen into water and after the driver rides on the vehicle again after the engine stop, time and trouble are involved in fitting the small retaining claws at the tip of the lanyard cord to the driving projecting portion of the stop switch.

In addition, if an attempt is made to apply the conventional immobilizer for preventing the theft of an automobile to a surface propelled vessel having an engine stopping apparatus, since the arrangement provided is such that the transponder is incorporated in the key and is held on the vehicle body side during driving, it is impossible to cope with the case in which the driver has fallen into water or fallen off the vehicle. Further, the immobilizer cannot be generally applied to a compact propelled vessel which does not have a key switch structure (main switch).

SUMMARY OF THE INVENTION

In view of the above-described conventional art, it is an object of the invention to provide an engine stopping apparatus which makes it possible to prevent theft by preventing unauthorized driving by a third party without using a cord for connecting the driver to the vehicle body, and which makes it possible to stop the engine upon detecting the driver falling into water or falling off the vehicle.

To attain the above object, in accordance with the present invention there is provided an engine stopping apparatus comprising: a vehicle body with an engine mounted therein; a transponder to which information on identification of a driver has been inputted; a collating circuit for identifying the driver on the basis of a response signal from the transponder; and a control circuit for controlling the driving of the engine on the basis of a result of collation by the collating circuit, wherein the transponder is arranged to be held in a state of being worn on a driver side separately from the vehicle body.

According to this arrangement, since the transponder to which identification information has been inputted is held on the driver side, it is possible to prevent theft by preventing unauthorized driving by a third party by identifying the driver with a simple arrangement without using a connecting cord such as a lanyard cord. In addition, it becomes possible to stop the engine upon detecting an emergency such as the falling into water or falling off the vehicle of the driver.

It should be noted that the term "during running" means that the engine is being operated, and includes not only a case in which the vehicle body is actually running (or cruising) but also a case in which the vehicle body is at a standstill with the engine in an idling state.

In a preferred example, the control circuit constantly transmits a collation signal to the transponder at fixed periods during running, and when the response signal from the transponder with respect to the collation signal is absent, the engine is stopped.

According to this arrangement, a collation signal can be transmitted from the vehicle body side to the transponder worn on the driver side at fixed periods, and the presence of the driver can be confirmed by the presence or absence of a response signal from the transponder. When the response signal from the transponder is absent, the engine can be stopped upon determining that the driver has fallen into water or fallen from the vehicle.

In a still another preferred example, the vehicle body is a compact propelled vessel.

According to this arrangement, particularly when the driver has fallen into water from a compact propelled vessel, the engine is immediately stopped, so that the vessel body does not move far away from the position where the driver has fallen into water, so that the driver is able to ride on the vessel again easily.

DETAILED DESCRIPTION OF THE PREFERRED EMBODIMENT

Hereafter, a description will be given of an embodiment of the invention with reference to the drawings.

Figure 1:
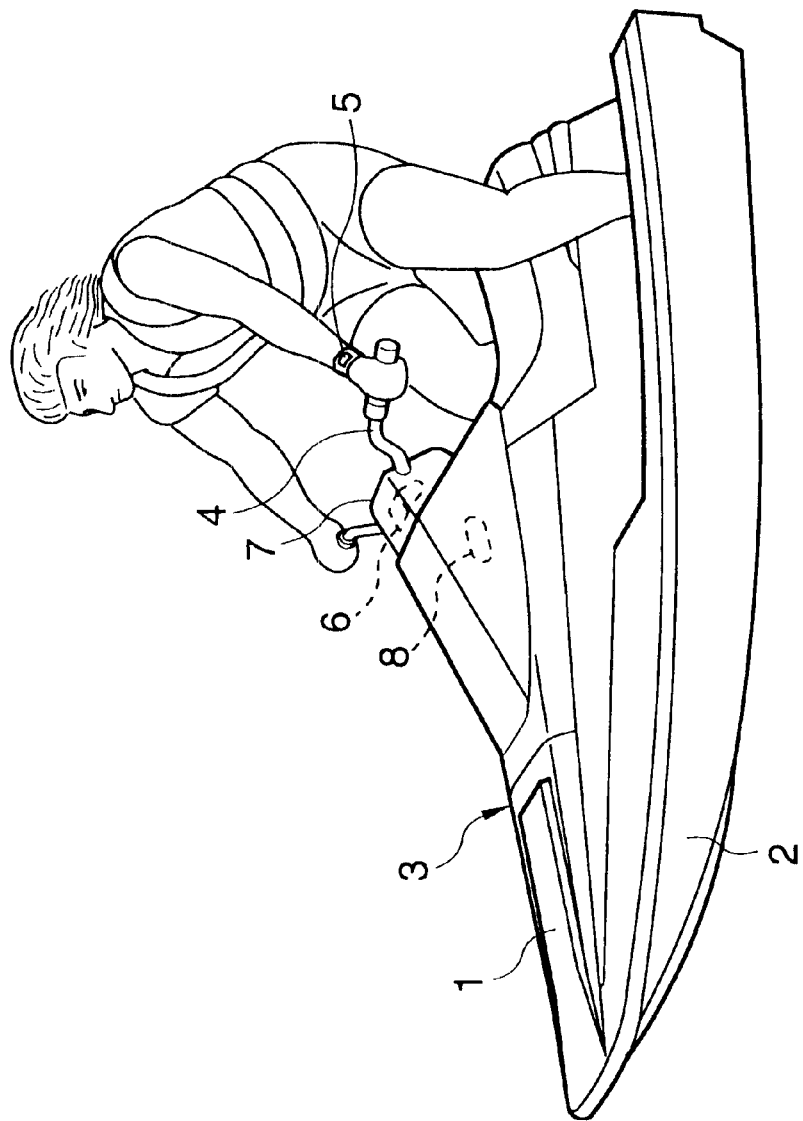
FIG. 1 is an external view of a compact surface propelled vessel to which the invention is applied.

FIG. 1 is an external view of a compact surface propelled vessel in accordance with an embodiment of the invention. Handlebars 4 are attached to a central upper portion of a vessel body 3 formed by joining a deck 1 and a hull 2. A transponder 5, to which information on identification of a driver (ID information) has been inputted, is fitted by means such as a wrist band over a wrist of the driver who steers the handlebars 4. An antenna 6 for transmitting and receiving a collation signal radio wave with respect to the transponder 5 is provided in a steering-shaft accommodating section 7 formed of a soft material such as urethane and constituting an attaching portion for attaching the handlebars 4. An identifying unit 8 for collating the driver by transmitting and receiving a collation signal for the driver through the antenna 6 is provided in the vessel body 3.

An engine stopping apparatus of the invention is formed by the transponder 5 fitted on the driver side and by the antenna 6 and the identifying unit 8 provided on the vessel body side, as will be detailed later. It should be noted that the antenna 6, in terms of its position, can be disposed not only at a root portion of the handlebars but also at an appropriate position inside the vessel body allowing transmission and reception with respect to the transponder 5 worn on the body by the driver by taking the output of a transceiver into consideration. In addition, as for the range which allows transmission and reception with respect to the transponder 5, it is assumed that the radio wave reaches the transponder 5 in whatever a posture the driver assumes, such as one in which the driver raises his or her arm, in the state in which the driver is aboard the vessel. The output of the transceiver is set in as narrow a range as possible so that the falling into water of the driver can be immediately detected when the driver has fallen into water, as will be described later.

Figure 2:
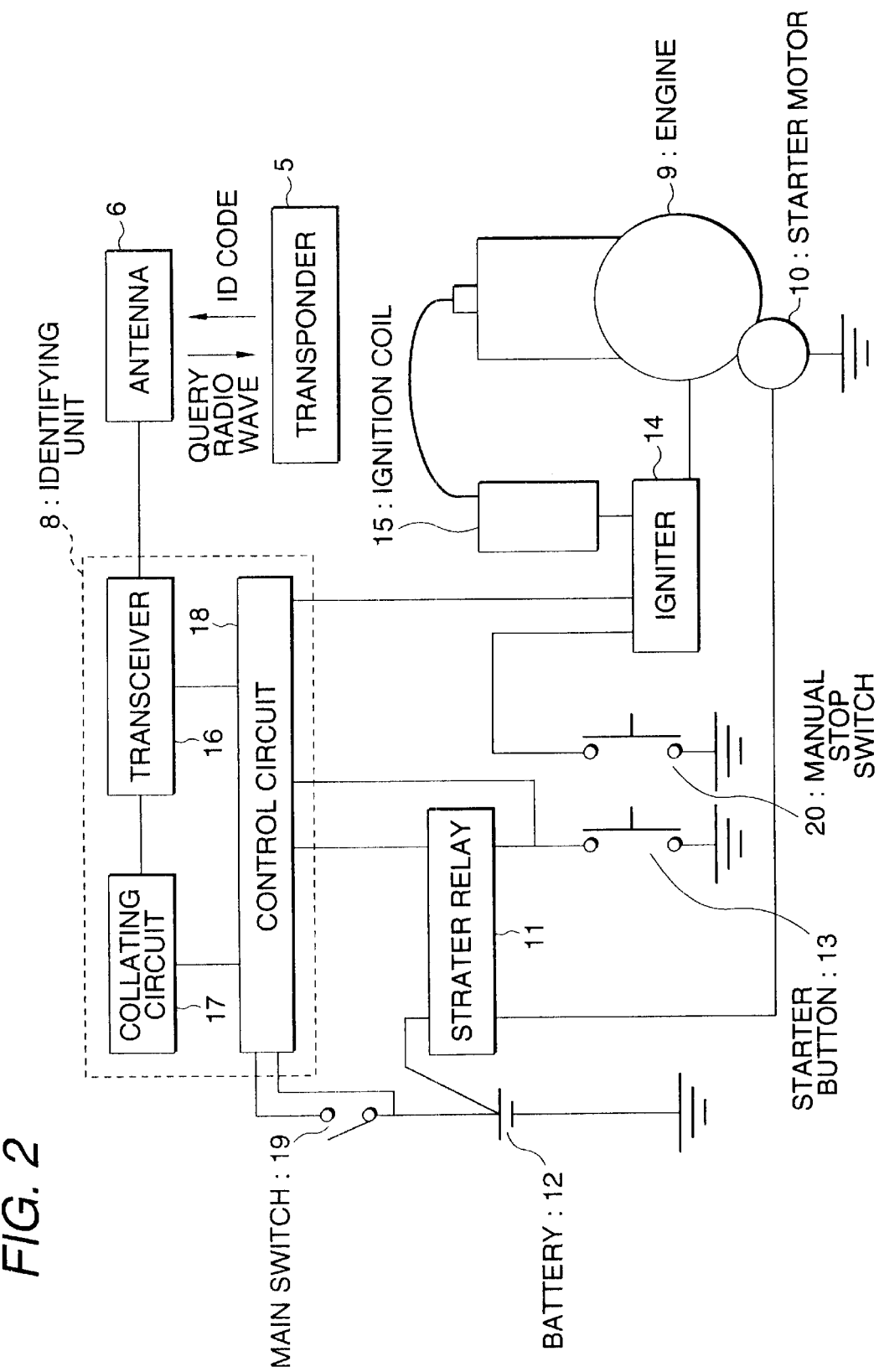
FIG. 2 is a block diagram of an engine stopping apparatus in accordance with the invention.

FIG. 2 is a schematic diagram of the engine stopping apparatus in accordance with the embodiment of the invention.

An engine 9 is mounted in the vessel body. This engine 9 is started by a starter motor 10. The starter motor 10 is connected via a starter relay 11 to a battery 12 mounted in the vessel, and is also connected to a starter button 13. The engine 9 is ignited and driven by operating an ignition coil 15 by an igniter 14. A manual stop switch 20 is connected to the igniter 14, so that the engine can be stopped manually, as required.

As already described with reference to FIG. 1, the identifying unit 8, which is connected to the antenna 6 provided in the vessel body, is provided. This identifying unit 8 includes a transceiver 16 for transmitting and receiving a collation radio wave through the antenna 6; a collating circuit 17 for subjecting the transmitted or received collation radio wave to analyzing processing; and a control circuit 18 for driving the engine on the basis of the result of processing by the collating circuit 17. The collating circuit 17 (or the control circuit 18) has a storage circuit, in which identification information registered in advance is stored, transmits a collation signal to the transponder 5, confirms the presence or absence of its response signal, and collates it with the registered identification information.

The control circuit 18 is connected to the battery 12, the starter button 13, and the igniter 14, and sets the engine 9 in a startable state or stops it depending on the result of collation by the collating circuit 17. If the engine 9 is set in a startable state, the engine 9 can be started if the starter button 13 is pressed. This control circuit 18 maybe configured by using an engine control unit (ECU) originally provided for controlling the operation of the engine 9 and by adding a routine for collation determination to the ECU. In addition, an arrangement may be provided such that a main switch 19 for turning on the power during the starting of the engine is provided between the control circuit 18 and the battery 12.

This main switch 19 may be omitted.

Next, a description will be given of the operation of the engine stopping apparatus having the above-described construction.

First, after wearing an ID tag (transponder 5) on the body (on the wrist as shown in FIG. 1), the driver rides on the vessel. Next, the driver presses the starter button 13. Consequently, the power source of the identifying unit 8 is turned on. Subsequently, a query radio wave (collation signal) is transmitted from the collating circuit 17 through the transceiver 16 and the antenna 6, and energy necessary for a responding operation is imparted to the transponder 5. Upon obtaining electric power on the basis of the principle of electromagnetic induction, the transponder 5 returns as a response signal ID data (identification information) inputted in advance. The identifying unit 8 receives this Id data through the antenna 6. Whether or not the received ID data matches with the information registered in advance is determined by the collating circuit 17. If the result of collation matches with the registered information, the power source for the starter relay 11 and the igniter 14 is turned on by the control circuit 18. Incidentally, if a plurality of items of identification information are registered in advance, the use by a plurality of persons becomes possible.

Here, if the driver presses the starter button 13 again (or continues to press it), the starter motor 10 is driven, and the ignition coil is operated to start the engine 9.

On the other hand, if the received ID data fails to match with the registered information, the power source for the starter relay 11 and the igniter 14 is not turned on, and remains in the off state, so that the engine 9 is not started.

It should be noted that if the main switch 19 is provided, an arrangement may be provided such that when the main switch 19 is turned on, the power source for the identifying unit 8 is turned on so as to start the collating operation.

During running after the engine start, the collating circuit 17 constantly transmits the query radio wave to the transponder 5 at fixed periods, and receives the response signal from the transponder 5. When the driver falls into water from the vessel body during the running, since the transponder 5 is. worn on the driver's body, the transponder 5 moves away from the vessel body and the radio wave fails to reach it, so that a response signal fails to be received. When the collating circuit 17 detects the absence of the response signal from the transponder 5, the control circuit 18 turns off the circuit of the igniter 14 to stop the engine 9. As a result, the vessel body stops near the driver who has fallen into the water.

When the driver rides on the vessel body again, and presses the starter button 13, the operation similar to the one described above is repeated, and the engine 9 is started and set in the running state.

As described above, in the invention, since the transponder to which identification information has been inputted is held on the driver side, it is possible to prevent theft by preventing unauthorized driving by a third party by identifying the driver with a simple arrangement without using a connecting cord such as a lanyard cord. In addition, it becomes possible to stop the engine upon detecting an emergency such as the driver falling into the water or falling off the vehicle. In this case, when the driver rides on the vessel or rides on the vehicle again and resumes the operation, since it is unnecessary to connect a cord or the like, the resumption of operation can be facilitated.

What is claimed is:

1. An engine stopping apparatus comprising:

a vehicle body;

an engine mounted in said vehicle body;

a transponder;

a collating circuit for identifying a driver on the basis of a response signal from said transponder; and a control circuit for controlling the driving of the engine on the basis of collation by said collating circuit, wherein information on identification of said driver is inputted to said transponder, and said transponder is arranged to be held in a state of being worn on said driver side separately from said vehicle body, wherein said control circuit shuts off said engine if said transponder moves a predetermined distance away from said vehicle body.

2. The engine stopping apparatus according to claim 1, wherein said control circuit constantly transmits a collation signal to said transponder at fixed periods during running, and when the response signal from said transponder with respect to the collation signal is absent, said engine is stopped.

3. The engine stopping apparatus according to claim 2, wherein said vehicle body is a compact propelled vessel.

4. An engine stopping apparatus, comprising:

an engine;

a transponder remotely disposed from said engine;

an identifying unit for emitting and receiving signals to/from said transponder and for determining whether said signals correspond to a predetermined identification code;

wherein said identifying unit controls an initial ignition of said engine and controls the continuous running of said engine, and if said identifying unit fails to receive a signal corresponding to the predetermined identification code, said identifying unit causes said engine to automatically shut off.

5. An engine stopping apparatus, comprising:

a vehicle body;

an engine mounted in said vehicle body;

a transponder for being worn by a driver;

a collating circuit for sending and receiving signals from said transponder; and a control circuit for controlling the driving of the engine on the basis of the signals received from said collating circuit, wherein said collating circuit does not receive signals from said transponder if the driver having said transponder is displaced from said vehicle body so as to cause said control circuit to stop driving of the engine.

* * * * *